Oct. 14, 1958  J. G. VOLLMER, SR  2,855,868
MACHINE FOR MAKING FILLED ICE CREAM BARS
Filed Nov. 5, 1956  5 Sheets-Sheet 2

INVENTOR.
Joseph G. Vollmer Sr.
BY
Atty.

Oct. 14, 1958     J. G. VOLLMER, SR     2,855,868
MACHINE FOR MAKING FILLED ICE CREAM BARS
Filed Nov. 5, 1956     5 Sheets-Sheet 3
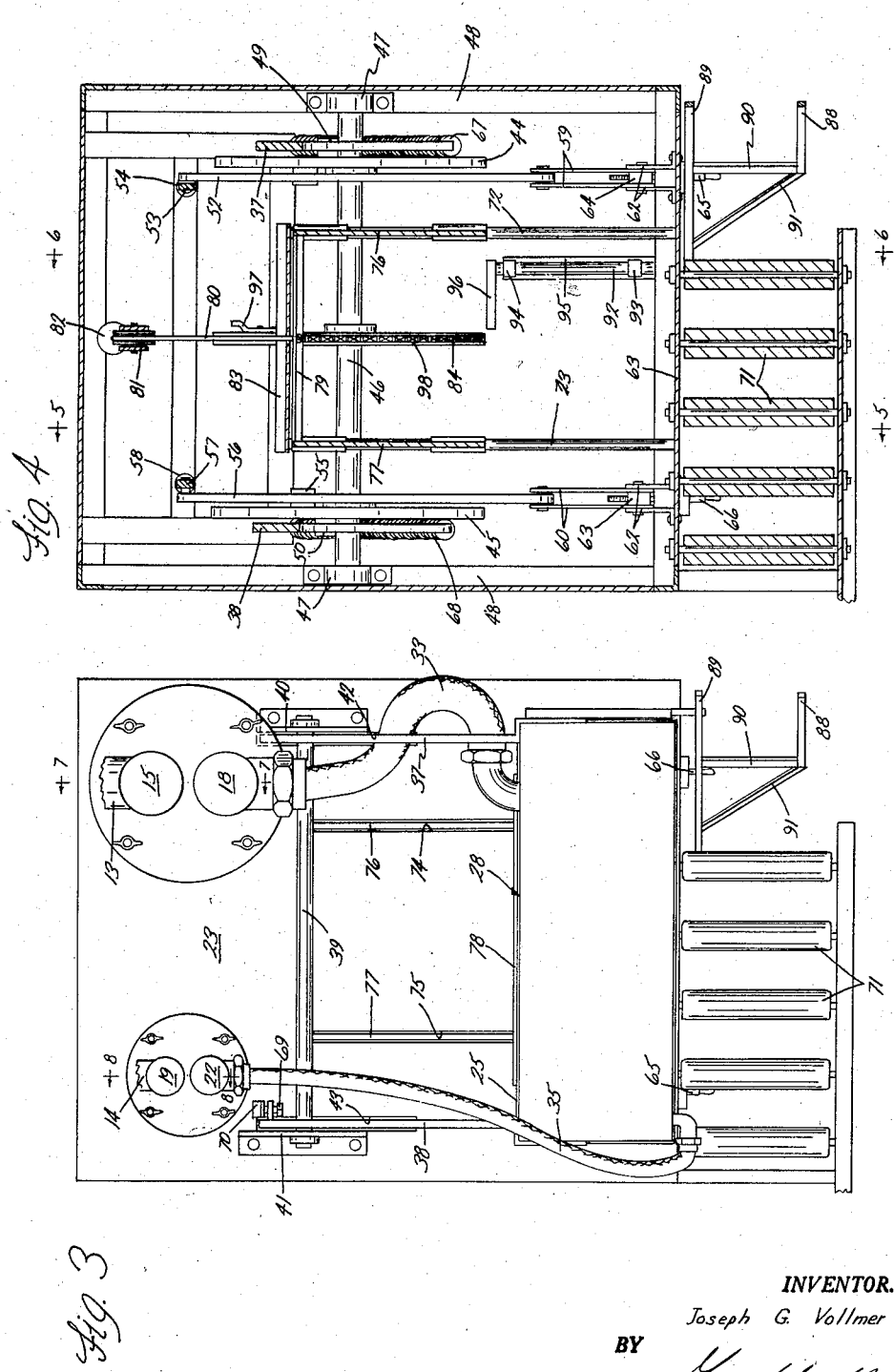
INVENTOR.
Joseph G. Vollmer Sr.
BY
Atty.

Oct. 14, 1958         J. G. VOLLMER, SR         2,855,868
          MACHINE FOR MAKING FILLED ICE CREAM BARS
Filed Nov. 5, 1956                         5 Sheets-Sheet 4
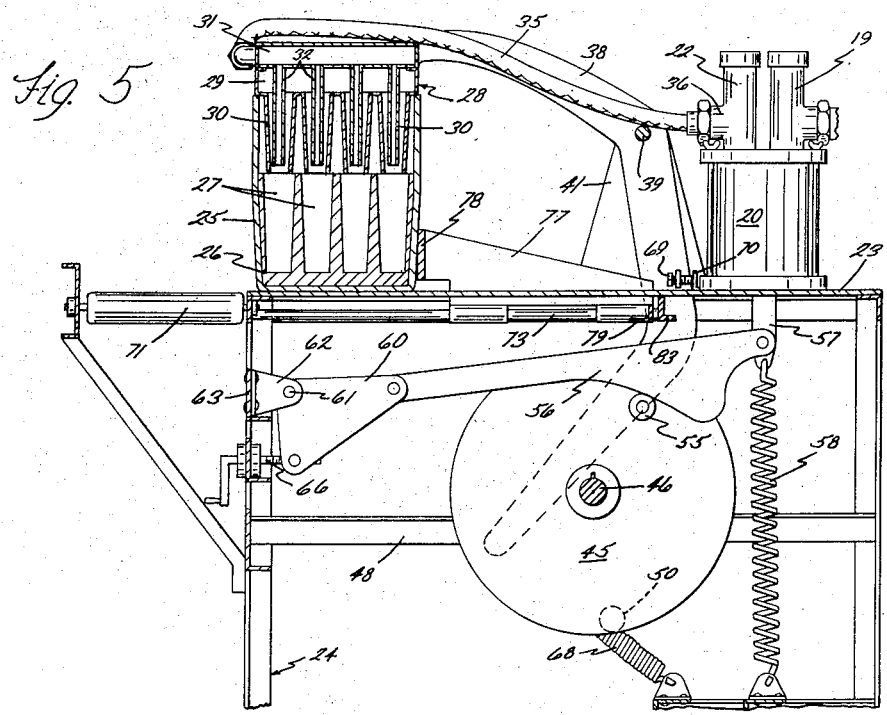
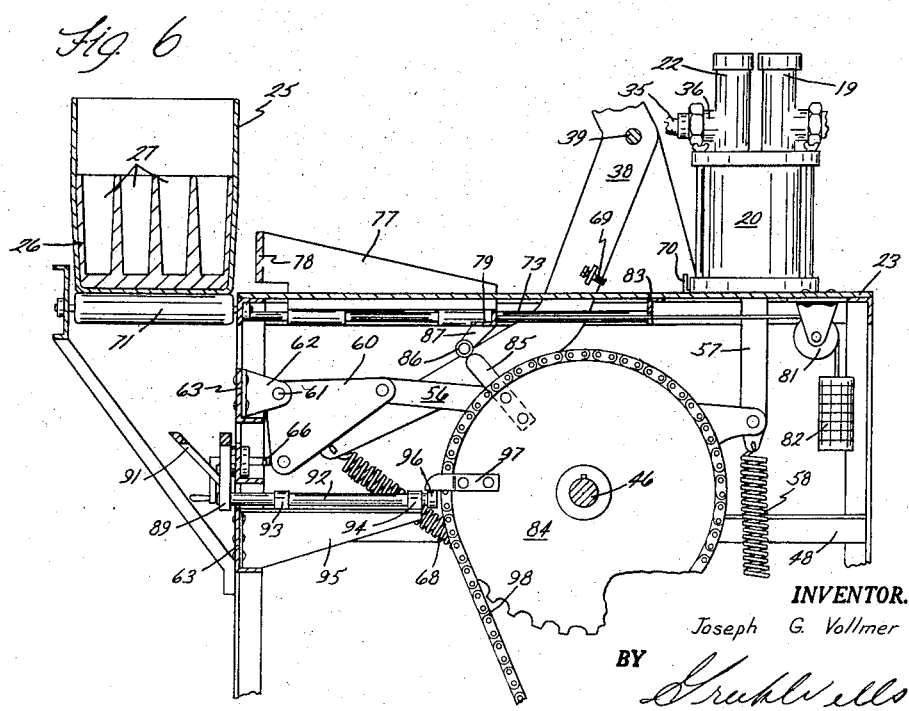
INVENTOR.
Joseph G. Vollmer Sr.
BY
Atty.

Oct. 14, 1958  J. G. VOLLMER, SR  2,855,868
MACHINE FOR MAKING FILLED ICE CREAM BARS
Filed Nov. 5, 1956  5 Sheets-Sheet 5
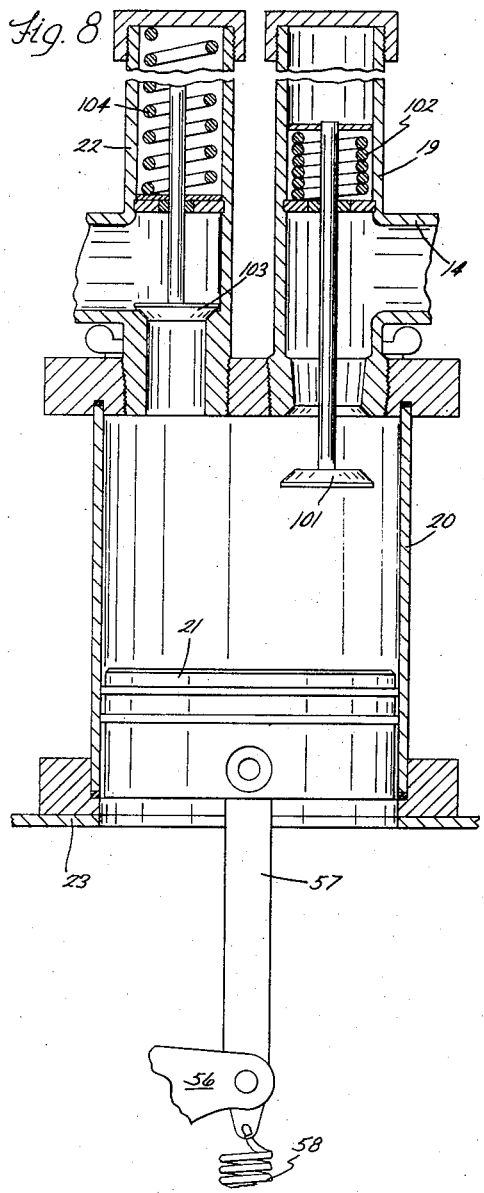
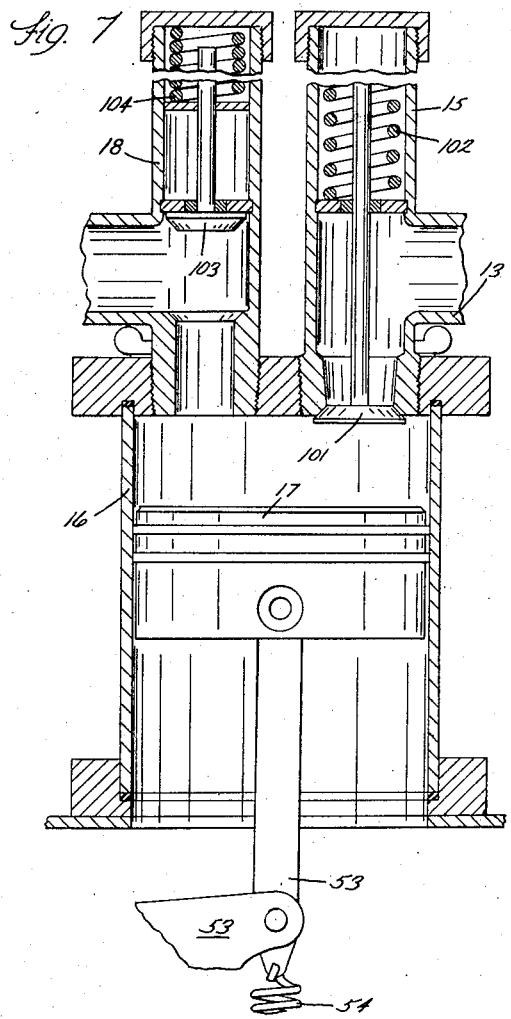
INVENTOR.
Joseph G. Vollmer Sr.
BY
Atty.

United States Patent Office 2,855,868
Patented Oct. 14, 1958

2,855,868

MACHINE FOR MAKING FILLED ICE CREAM BARS

Joseph G. Vollmer, Sr., Boise, Idaho, assignor to Tast-Y Sun-D Inc., Boise, Idaho, a corporation of Idaho Application November 5, 1956, Serial No. 620,541

8 Claims. (Cl. 107—8)

This invention relates to a machine for making filled ice cream bars and the like wherein a center filling of fruit or other tasty ingredient is surrounded with a milk product, the whole being frozen and usually coated with an exterior coating of chocolate, caramel or the like. It is the principal purpose of my invention to provide a machine which draws filler mix and the main body mix simultaneously from suitable storage tanks and injects the mixes simultaneously into molds having multiple cavities, the molds then being discharged from the machine so that new molds may be positioned for filling.

It is also a purpose of my invention to provide a machine of this character wherein the sequence of operations is carried out entirely mechanically once the machine is started from a single driving unit.

It is also a purpose of my invention to provide a novel construction wherein the filled molds are pushed laterally from filling position as soon as the filling operation is completed and are then shifted away from the machine by a pusher mechanism operated in timed sequence with the pushing mechanism.

The nature and advantages of my invention will appear more fully from the following description and the accompanying drawings. It should be understood, however, that the drawings and descriptions are illustrative only and are not intended to limit the invention except insofar as it is limited by the claims.

In the drawings:

Figure 3 is a plan view of the machine;

Figure 4 is a sectional view taken substantially on the line 4—4 of Figure 1;

Figure 5 is a sectional view taken on the line 5—5 of Figure 4;

Figure 6 is a sectional view taken on the line 6—6 of Figure 4;

Figures 7 and 8 are enlarged fragmentary sectional views taken on the line 7—7 and 8—8 of Figure 3 and illustrating two different positions of the pistons and valves of the mix feeding cylinders.

Figure 1:
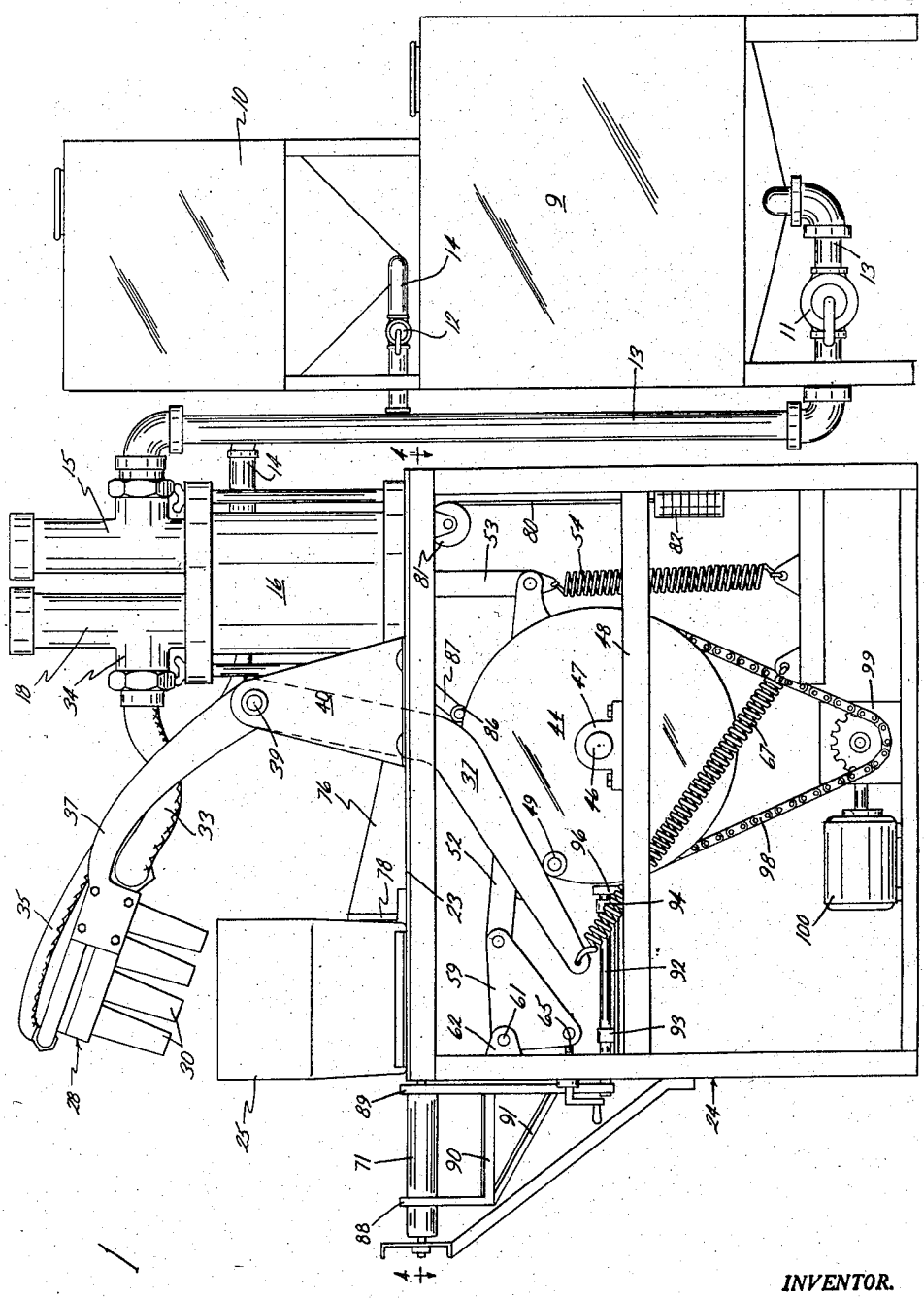
Figure 1 is a side view of a machine embodying my invention.

Referring now to the drawings, the machine as illustrated in side view in Figure 1 has a tank 9 for holding a supply of ice cream mix. Above this tank 9 there is a smaller tank 10 which is adapted to hold a supply of the filling mix such as a ground fruit mix. Suitable valves 11 and 12 are provided in bottom outlet pipes 13 and 14 for the tanks 9 and 10. The pipe 13 leads to a valve unit 15 that opens into a cylinder 16 having a piston 17 which is reciprocated to draw mix into the cylinder 16 and to discharge the mix into a valve 18. The pipe 14 leads to a valve unit 19 which is located in the top of the cylinder 20 which has a piston 21 that is adapted to draw the material into the cylinder 20 and discharge it through a valve unit 22.

The cylinders 16 and 20 are mounted on the top plate 23 of a frame 24 that carries the rest of the mechanism by which the mixes from the tanks 9 and 10 are transferred into multiple mold trays 25. As illustrated best in Figures 5 and 6, the trays 25 contain molds 26 which have a multiplicity of cells 27 that receive the mixes from a filler head assembly 28. The filler head assembly 28 comprises a lower chamber 29, having tubular outlets 30 that open downwardly and an upper chamber 31 having tubular outlets 32 extending down into the outlets 30 and located concentrically therewith. The chamber 29 is connected by a flexible tube 33 to the outlet nipple 34 of the valve unit 18. The chamber 31 is connected by a flexible tube 35 to the outlet nipple 36 of the valve unit 22.

The filler head assembly 28 is carried by two arms 37 and 38. These arms are pivoted on a cross shaft 39 that is carried by two standards 40 and 41 projecting upwardly from the top plate 23 of the frame 24. The arms 37 and 38 extend through openings 42 and 43 that are cut in the top plate 23 and extend downwardly and forwardly alongside two cam plates 44 and 45. The cam plates 44 and 45 are fixed on a shaft 46 that is journalled in bearings 47. The bearings 47 are mounted on cross members 48 of the frame 24. The plate 44 carries a roller 49 which engages the arm 37 to lift the filler head assembly. The cam plate 45 carries a roller 50 engaging the arm 38 to lift the other end of the filler head assembly 28.

The cam plates 44 and 45 also operate the pistons 17 and 21. The cam plate 44 carries a roller 51 which engages an arm 52, one end of which is connected to a stem 53 depending from the piston 17. A spring 54 is also connected to the stem 53 and serves to retract or pull the piston 17 down. The cam plate 45 carries a roller 55 which engages an arm 56 that is connected to a stem 57 depending from the piston 21. A spring 58 is also connected to the stem 57 to pull the piston 21 down. The arms 52 and 56 extend forwardly and are pivoted to adjusting members 59 and 60 respectively. These adjusting members are alike. They are pivoted by pins 61 and ears 62 to a front wall 63 of the frame 24. The adjusting members 59 and 60 are triangular in shape and have blocks 63 and 64 pivoted in their lowermost corners. These blocks are threaded to receive the adjusting screws 65 and 66. It will be evident that by adjusting the position of the members 59 and 60, the lever arms 52 and 56 can be made to raise their pistons 17 and 21 more or less to control the stroke, and thus control the amount of mix supplied to the filler head assembly 28.

The arms 37 and 38 for raising and lowering the filler head assembly are urged against their respective rollers 49 and 50 by springs 67 and 68. It is desirable also to limit the downward movement of the filler head assembly 28 so that it will not be limited solely by engagement with the tray 25. Adjustable stops in the form of the threaded bolts 69 are mounted on the arms 37 and 38 and engage stop blocks 70 that are provided on the top plate 23. The stops 69 can be closely adjusted so as to limit the downward movement of the filler head assembly into the tray 25.

My invention also includes means for removing the tray 25 from the top plate 23 and discharging it from the machine after it is filled. For this purpose the machine is provided with a series of free rollers 71 across the front thereof and extending beyond the machine to the left, as illustrated in the plan view of Figure 3. The tray 25, when positioned on the rollers 71 can be shoved to the left and discharged. The operation of removing the tray from the top plate 23 and shoving it to the left is carried out automatically by the mechanism which will now be described. Beneath the top plate 23 the frame 24 carries two guide rods 72 and 73, and projecting upwardly from these guide rods through slots 74 and 75 in the top plate 23 are two supporting brackets 76 and 77. These brackets carry a pusher bar 78 which is adapted to engage the tray 25 and they are connected together beneath the plate 23 by an angle iron 79. A cable 80 is connected to the angle iron 79 and extends rearwardly over a pulley 81 that is suspended from the plate 23. This cable 80 carries a weight 82 so that normally the brackets 76 and 77 and the pusher plate 78 are held in the position shown in Figures 1 and 5, against an angle iron 83 that depends from the plate 23 and carries the guide rods 72 and 73.

Between the two cam plates 44 and 45 there is a drive gear 84 keyed to the shaft 46. This drive gear carries a projection 85 which is adapted to engage a roller 86 on an arm 87 that is carried by the angle iron 79. The angle iron 79, being a cross piece that connects the two brackets 76 and 77, will move the brackets 76 and 77 to the left when roller 86 is engaged by the projection 85 in the manner illustrated in Figure 6 of the drawings. In this way the tray 25 is pushed off the top plate 23 onto the rollers 71. As soon as the projection 85 moves past the roller 86 the weight 82 will, of course, return the parts 76, 77 and 78 to the position shown in Figure 5.

Figure 2:
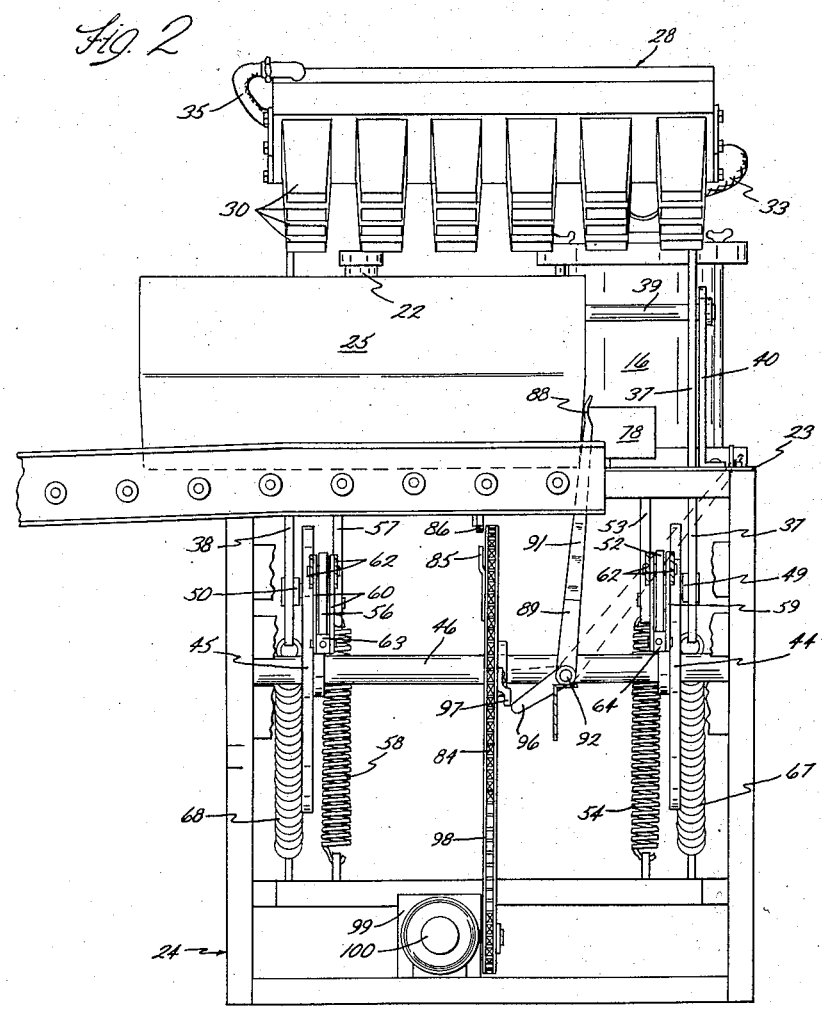
Figure 2 is a front view of the machine.

Means are also provided to shove the tray 25 endwise along the rollers to the left as soon as it is positioned on the rollers. This means comprises two fingers 88 and 89 which are joined together by braces 90 and 91 and which are extended downwardly and pivotally supported by a shaft 92. The shaft 92 is journalled in bars 93 and 94 upon a bar 95 that projects from the front plate 63 rearwardly. At its rear end the shaft 92 carries a lever arm 96. This lever arm 96 is in the path of a finger 97 that is secured on the gear 84. When the finger 97 hits the lever arm 96 it swings the fingers 88 and 89 from the dotted line position shown in Figure 2 to the full line position, thus giving the tray 25 a shove to the left to discharge it from the machine.

The entire drive of the machine is accomplished by a drive chain 98 driven through a gear reduction unit 99 from a motor 100. Any suitable controls can be provided for the motor so that the operator can start the machine and stop it at will, or start the machine and have it go through a complete cycle and then stop. Such devices are well known and hence are not shown.

In order that the operation may be more fully understood, a complete cycle of operation will now be described. Initially a tray is placed in the position shown in Figure 1 and the machine is then started. The first thing that takes place is the lowering of the filler head assembly 28 into the tray as the arms 37 and 38 are allowed to move down by their cam plate rollers 49 and 50. At this initial operation it is assumed that the pistons 17 and 21 are retracted to their lowermost position as shown in Figure 8 so that they have drawn in a filling of mix in the cylinders 16 and 20. The next step in the operation is the engagement of the lever arms 52 and 56 by their cam rollers 51 and 55 respectively. The arms 52 and 56 are so shaped that they are quickly raised by the rollers 51 and 55 to lift the pistons 17 and 21 and eject the fillings of mix from the cylinders 16 and 20 through the tubes 33 and 35 into the filler head assembly and pour it into the mold sections 27 of the mold 26 in the tray 25. When the rollers 51 and 55 permit the arms 52 and 56 to move downward, the springs 54 and 58 retract the pistons 17 and 21 by pulling down on the stems 53 and 57 and this draws in a new charge of mix into each of the cylinders 16 and 20 through the valve units 15 and 19. The cam rollers 49 and 50 then travel upward to lift the arms 37 and 38 to raise the filler head assembly 28 out of the tray 25. While the filler head assembly is so raised the projection 85 on the sprocket gear 84 engages the roller 86 and moves the pusher bar 78 to the left as shown in Figures 5 and 6 to discharge the tray 25 onto the rollers 71. Immediately upon the completion of this action the finger 97 engages the arm 96 on the shaft 92 and swings the fingers 88 and 89 against the tray 25 to push it to the left and discharge it from the machine. This completes a cycle of operation and readies the machine for filling another tray of molds.

The valve assemblies 15, 18, 19 and 22 are illustrated best in Figures 7 and 8. It is believed that their operation is somewhat obvious. Valve assembly 15 and valve assembly 19 are identical except for size, and valve assemblies 18 and 22 are also identical except for size. In the assembly 15 the valve 101 is normally closed by a spring 102 but will open under suction created by downward movement of the piston 17, and when open, the suction due to the downward movement of the piston 17 will draw in a supply of ice cream mix from the tank 9. As soon as the filling of ice cream mix overcomes the vacuum in the cylinder 16, the valve 101 will be closed by the spring 102.

The valve unit 18 has a downwardly closing valve 103 which is normally urged into closed position by a spring 104. The valve 103 will remain closed until such time as pressure of the piston 17 on the mix in the cylinder 16 is sufficient to lift the valve 103 against the pressure of the spring 104. As soon as the pressure is relieved the valve 103 will again seat.

It is believed that the nature and advantages of my invention will be clear from the foregoing description.

Having thus described my invention, I claim:

1. In a machine adapted to fill cavity molds having a mold support for supporting a cavity mold with a filler head assembly movable up and down above said mold and provided with discharge nozzles positioned to register with the cavities of said mold when the filler head assembly is lowered upon a mold resting upon said support, the improvement comprising a pusher bar on the support against which the mold rests while being filled, means operable only when the filler head assembly is raised free of the mold to move the pusher bar toward the mold and thereby remove the mold from the support, and rollers alongside the support receiving the mold.

2. In a machine adapted to fill cavity molds having a mold support for supporting a cavity mold with a filler head assembly movable up and down above said mold and provided with discharge nozzles positioned to register with the cavities of said mold when the filler head assembly is lowered upon a mold resting upon said support, the improvement comprising a pusher bar on the support against which the mold rests while being filled, means operable only when the filler head assembly is raised free of the mold to move the pusher bar toward the mold and thereby remove the mold from the support, rollers alongside the mold support upon which the mold is moved by said pusher bar, and means to move the mold on said rollers away from the position to which it is delivered by said bar.

3. In an apparatus for simultaneously ejecting a measured volume of an annulus of an exteriorly disposed plastic substance about a measured volume of a fluid or plastice core substance at intermittent intervals, the combination of a filler head asembly supported for vertical movement, said filler head assembly including pairs of inner and outer concentric discharge nozzles, two fluid mix cylinders, one cylinder being connected to the inner discharge nozzles and the other cylinder being connected to the outer discharge nozzles, pistons in said cylinders, a drive shaft, means connecting the drive shaft to said filler head assembly to raise the filler head assembly away from molds therebeneath and a second means connecting the drive shaft to said pistons to move the pistons in a direction to feed material to the discharge nozzles only when the filler head assembly is lowered upon molds therebeneath.

4. In an apparatus for batch filling molds with substances in a fluid or plastic state, the combination of a filler head having discharge nozzles thereon, arm means supporting said filler head for vertical movement, a cylinder having one closed end and having a piston therein movable toward and away from said closed end, a supply container, conduit means connecting said container to said cylinder, intake valve means between said conduit and said cylinder operable upon movement of the piston in the cylinder away from the closed end to admit substance from the supply container to the cylinder, flexible conduit means connecting the cylinder to the filler head discharge nozzles, exhaust valve means between the cylinder and said conduit operable upon movement of the piston toward the closed end of the cylinder to open and permit substance to flow from the cylinder to the filler head, means to move the arm means supporting the filler head up and down, and means to move the piston toward the closed end of the cylinder only when the filler head is moved down.

5. In an apparatus for batch filling molds with substances in a fluid or plastic state, the combination of a filler head having discharge nozzles thereon, arm means supporting said filler head for vertical movement, a cylinder having one closed end and having a piston therein movable toward and away from said closed end, a supply container, conduit means connecting said container to said cylinder, intake valve means between said conduit and said cylinder operable upon movement of the piston in the cylinder away from the closed end to admit substance from the supply container to the cylinder, flexible conduit means connecting the cylinder to the filler head discharge nozzles, exhaust valve means between the cylinder and said conduit operable upon movement of the piston toward the closed end of the cylinder to open and permit substance to flow from the cylinder to the filler head, power means including a drive shaft, cam means on said drive shaft, lever means operatively engaged with said cam means and connected to the arm means supporting the filler head, said lever means operable to lower the filler head and raise the filler head upon rotation of the cam means, and second lever means operatively engaged with the cam means and connected to said piston operable to move said piston toward the closed end of the cylinder only while the filler head is lowered.

6. In an apparatus for batch filling cavity molds with a substance in a fluid or plastic condition, the combination of a filler head supported for movement up and down, means for supplying measured quantities of substance to said filler head only when it is in a lower position, a mold supporting platform beneath the filler head, roller means adjacent the support platform for carrying molds away from the apparatus, pusher bar means adjacent the support platform on the side thereof opposite the roller means, power means operable to lower the filler head into a mold mounted on the support platform and to raise the filler head above the mold, means operable only when the filler head is raised to move the pusher bar across the support platform to move the mold thereon onto the roller means, and finger means adjacent the roller means operable upon movement of the pusher bar means to move against a mold on the roller means to give it an impetus away from the support platform.

7. In an apparatus for batch filling cavity molds with a substance in a fluid or plastic condition, the combination of a filler head supported for movement up and down, means for supplying measured quantities of substance to said filler head only when it is in a lowered position, a mold supporting platform beneath the filler head, roller means adjacent the support platform for carrying molds away from the apparatus, pusher bar means adjacent the support platform on the side thereof opposite the roller means, and power means operable to lower the filler head into a mold mounted on the support platform and to raise the filler head above the mold, means operable only when the filler head is raised to move the pusher bar across the support platform to move the mold thereon onto the roller means.

8. In an apparatus for batch filling cavity molds with a substance in a fluid or plastic condition, the combination of a filler head supported for movement up and down, means for supplying measured quantities of substance to said filler head only when it is in a lowered position, a mold supporting platform beneath the filler head, roller means adjacent the support platform for carrying molds away from the apparatus, pusher bar means adjacent the support platform on the side thereof opposite the roller means, power means including a drive shaft, cam means on the drive shaft, lever means operatively engaged with said cam means and connected to said filler head, said lever means being operable to move the filler head downwardly into a mold on the platform, and operable to raise the filler head above the mold when the mold is filled, and second lever means operatively engaged with said cam means and connected to said pusher bar means, and operable to move the pusher bar across the support platform and push the mold onto the roller means only when the filler head is raised.

References Cited in the file of this patent

UNITED STATES PATENTS

| | | |
|---|---|---|
| 1,168,305 | Hood | Jan. 18, 1916 |
| 2,032,163 | Bagby | Feb. 25, 1936 |
| 2,271,767 | Hummel | Feb. 3, 1942 |
| 2,282,313 | Hershey | May 12, 1942 |
| 2,284,651 | Gundlach et al. | June 2, 1942 |
| 2,344,901 | Routh | Mar. 21, 1944 |
| 2,649,744 | Elwell | Aug. 25, 1953 |
| 2,673,675 | Anderson | Mar. 30, 1954 |